United States Patent [19]

Birkmeyer et al.

[11] 4,314,918

[45] Feb. 9, 1982

[54] COATING COMPOSITIONS CONTAINING ORGANIC ALCOHOLIC REACTIVE DILUENTS

[75] Inventors: William J. Birkmeyer, Oakmont; Ronald J. Lewarchik, Natrona Heights; Joseph A. Klanica, Sarver; Carl C. Anderson, Allison Park, all of Pa.

[73] Assignee: PPG Industries, Inc., Pittsburgh, Pa.

[21] Appl. No.: 163,354

[22] Filed: Jun. 26, 1980

[51] Int. Cl.$^3$ .......................... C09D 3/58; C09D 3/64
[52] U.S. Cl. ..................................... 260/20; 260/19 A; 260/19 EP; 260/21; 260/22 CQ; 260/22 EP; 260/30.4 R; 260/30.4 N; 260/38; 260/39 R; 260/31.4 R; 525/124; 525/131; 525/143; 525/162; 525/440; 525/443; 525/504; 525/507; 525/508; 525/509; 525/519; 525/520
[58] Field of Search ........ 260/22 CQ, 22 EP, 30.4 R, 260/30.4 N, 31.4 R, 20, 21, 19 EP, 19 A; 525/124, 131, 143, 162, 504, 507, 508, 509, 519, 520, 440, 443

[56] References Cited

U.S. PATENT DOCUMENTS

| | | | |
|---|---|---|---|
| 3,883,454 | 5/1975 | Dhein et al. | 260/22 CQ |
| 3,919,351 | 11/1975 | Chang et al. | 525/124 |
| 3,928,420 | 12/1975 | Fang | 560/90 |
| 3,954,715 | 5/1976 | Fang | 525/519 |
| 3,954,899 | 5/1976 | Chang et al. | 525/520 |
| 3,956,210 | 5/1976 | Leary et al. | 260/22 EP |
| 3,962,369 | 6/1976 | Chang et al. | 525/520 |
| 3,975,457 | 8/1976 | Chang et al. | 525/131 |
| 3,991,003 | 11/1976 | Piggott | 260/33.6 UB |
| 3,994,851 | 11/1976 | Chang | 525/162 |
| 4,005,041 | 1/1977 | Piggott | 260/18 TN |
| 4,028,309 | 6/1977 | Fang | 528/58 |
| 4,042,547 | 8/1977 | Kaiser et al. | 260/22 CQ |
| 4,045,391 | 8/1977 | Buschfeld | 260/22 EP |
| 4,107,113 | 8/1978 | Gibson et al. | 260/22 EP |

FOREIGN PATENT DOCUMENTS

| | | |
|---|---|---|
| 493100 | 5/1975 | Australia . |
| 3674 | 12/1974 | South Africa . |
| 1317969 | 5/1973 | United Kingdom . |

OTHER PUBLICATIONS

Derwent Abst. 28304X/16 3-29-76 (BE833950) Bayer "Low Solvent Polyester . . . Reactive Diluent".
Derwent Abst. 16609B/09 1-20-79 (J54007-431) Hitachi Chem. KK "Reactive Diluent Prod. . . . ".

*Primary Examiner*—Herbert J. Lilling
*Attorney, Agent, or Firm*—Charles R. Wilson

[57] ABSTRACT

Reactive diluents are derived from the reaction of a glycidyl ester and a hydroxyl and/or carboxyl functional compound. The diluents are useful in coating compositions together with crosslinking agents and, optionally, polyols.

15 Claims, No Drawings

COATING COMPOSITIONS CONTAINING ORGANIC ALCOHOLIC REACTIVE DILUENTS

BACKGROUND OF THE INVENTION

The subject invention relates to reactive diluents and their use in coating compositions. More particularly, the invention relates to coating compositions which can be formulated to contain substantially no organic solvent of a high volatility.

Many different coating compositions possessing various physical characteristics are known. The coating compositions normally contain a curable film forming resin and a solvent or dispersant. Examples of curable resins include vinyl resins, acrylic resins, epoxy resins, urethane resins, etc. All the polymeric resins have inherent characteristics which make them more suitable than other resins for a particular end use. Various additives are also known which can be included in the coating compositions in minor amounts so as to modify the characteristics of the film former. The solvent or dispersant is present for the purpose of thinning the composition to facilitate its application to a substrate and to improve its flow properties. The solvent and dispersant can generally be defined as a chemical which thins a coating but is volatile and therefore is lost to the atmosphere when the composition is applied to a substrate. Suitable solvents and dispersants have included both organic solvents and water.

In recent years, there have been expressed concerns over the presence of solvents, especially organic solvents, in coating compositions. The organic solvents are mainly derived from petroleum products, and thus are expensive and in short supply. Additionally, a potential pollution problem exists with the organic solvents unless elaborate disposal or recovery procedures are used. A still further concern with the use of solvents in the coating compositions is with respect to the need to supply energy to the coated substrate to drive off the solvent.

Water-based coating compositions do not have an inherent potential pollution problem. As a result, much activity has been directed towards the formulation of water-based coating compositions in recent years. However, one of the problems associated with water-based compositions is the fact the polymeric film former normally has present various hydrophilic groups which are water sensitive and can react with water. As a result, films formed from the water-based compositions do not have all the physical characteristics oftentimes desired and needed. Additionally, energy is still needed to drive off the water, special corrosion-resistant equipment must be used and air conditioning systems are usually needed to control humidity.

Ideally, a coating composition would have little or no solvent present with the attendant problems, yet would be fluid enough for conventional application to substrates. Technologies such as described in U.S. Pat. No. 4,022,726, Zabrocki et al, May 10, 1977, wherein a reactive diluent is used, attempt to meet the above objectives. The reactive diluent is said to be capable of thinning the coating composition yet reactive with the film forming resin so as to become a part of the film upon cure. Unfortunately, many of the available "reactive diluents" evaporate from the thin film prior to reacting and thus do not fulfill their objective.

There has now been found a class of materials which can be used as reactive diluents in coating compositions. The reactive diluent desirably modifies the film former resin and at the same time thins the coating composition without a substantial pollution problem or energy demand. A consequence of using the reactive diluent is a substantially reduced need for the use of conventional organic solvents.

As used herein, all ratios and percents are by weight unless otherwise indicated.

SUMMARY OF THE INVENTION

The subject invention relates to reactive diluents and coating compositions capable of fluid application to a substrate. The vehicle portion of the compositions consists essentially of (a) from about 20% to about 70% of a crosslinking agent; (b) from about 0% to about 60% of a curable polyol resin and (c) from about 10% to about 70% of an organic reactive diluent capable of chemically combining with the crosslinking agent and, if present, polyol resin. The reactive diluents are derived from the reaction of (i) from about 0.25 to about 4 moles of a glycidyl ester with (ii) one mole of a functional material having a molecular weight of less than about 1000, a hydroxy equivalent weight of from about 30 to about 1000, a carboxy equivalent weight of from about 50 to about 1000 and further wherein the total hydroxyl and carboxyl functionality of the functional material is at least 2.0. The diluents have an acid number of less than about 50. Preferred reactive diluents have a non-volatile content of greater than about 85% and a Gardner-Holdt viscosity of less than Z-10.

DETAILED DESCRIPTION OF THE INVENTION

Reactive diluents, methods of making the diluents and their use in coating compositions are described below. The coating compositions of crosslinking agents, optionally polyol resins, and the reactive diluents, as well as their modes of application, are also described in the following paragraphs.

The reactive diluents of this invention are derived from the reaction of a glycidyl ester with a hydroxyl- and/or carboxyl-containing functional material. Glycidyl esters have the formula:

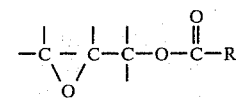

where R is a hydrocarbon group of from 1 to 17 carbon atoms. Preferred glycidyl esters have from 4 to 12 carbon atoms in the R moiety. The hydrocarbon group can be substituted with various moieties provided the resultant diluent has the characteristics set out below with respect to non-volatile content and viscosity. Examples of glycidyl esters include glycidyl acetate, glycidyl propionate, glycidyl methyl malaete, glycidyl stearate, glycidyl benzoate, glycidyl oleate and glycidyl ester of a saturated synthetic tertiary monocarboxylic acid having 9–11 carbon atoms.

The functional material reacted with the glycidyl ester has a molecular weight of less than about 1000, a hydroxy equivalent weight of from about 30 to about 1000 and a carboxy equivalent weight of from about 50 to about 1000, provided the total hydroxyl and carboxyl functionality of the functional compound is at least 2.0. Suitable functional materials include those with at least 2 hydroxyl groups, at least 2 carboxyl groups or at least 1 hydroxyl and 1 carboxyl group. Preferred functional materials have from 0 to 10 hydroxyl groups and from 0 to 10 carboxyl groups and a molecular weight of from about 60 to about 500. More preferred functional materials have from 0 to 3 hydroxyl groups and 0 to 3 carboxyl groups and a molecular weight of from 100 to about 300. Classes of the functional materials include the polyhydric compounds having 2 to 4 hydroxyl groups, dicarboxylic acid or anhydride and compounds having at least one hydroxyl group and at least one carboxyl group. Examples of useful functional materials include neopentyl glycol; dimethylolpropionic acid; 2,2-dimethyl-3-hydroxypropyl-2,2-dimethyl-3-hydroxypropionate; 12-hydroxystearic acid; adipic acid; hexahydrophthalic acid; phthalic acid, isophthalic acid; trimellitic acid; terephthalic acid; anhydrides of the acids where they exist; and mixtures thereof. Dimethylol-propionic acid and hexahydrophthalic anhydride are preferred.

Reactive diluents are made from the above described reactants by reacting from about 0.25 to about 4 moles of the glycidyl ester with one mole of the functional material. Preferred reactant ratios are from about 1 to about 3 moles glycidyl ester with each mole functional material. The reactants are generally added to a reaction mixture and are reacted at a temperature ranging from about 100° C. to about 200° C. An organic solvent can be present to facilitate the reaction, but is not required; examples of suitable solvents include methyl amyl ketone and the ethylene glycol mono- and dialkyl ethers. A catalyst such as butyl stannoic acid or dimethylcocoamine can be present to speed up the reaction.

The diluents are characterized by having an acid number of less than about 50. Preferred diluents are further characterized by having a non-volatile content of greater than about 85 percent, more preferably greater than about 90 percent, and a Gardner-Holdt viscosity of less than Z-10, more preferably less than Z-8. The non-volatile content is a measure of the reactive diluent's ability to be cured into the coating prior to being volatilized. It is determined by placing a 0.5 grams of the reactive diluent in an aluminum weighing dish and subjecting the contents to a 105° C. temperature for 2 hours. The non-volatile content is the percentage of diluent remaining.

The above physical characteristics are preferred in order to get the performance desired in this invention. Thus, the non-volatile content value of the diluent is needed so as to allow the diluent to react into the curable film forming component of the composition prior to volatizing into the atmosphere. Moreover, the preferred diluents have a Gardner-Holdt viscosity of less than Z-10 so as to result in a coating composition with a reduced viscosity, yet not a lower solids content. It should be understood, though, the reactive diluent can be solid at room temperature and still be useful in this invention.

Reactive diluents useful in the coating compositions of this invention are included at a level ranging from about 10% to about 70%, on a weight solids basis. A preferred range of reactive diluent for those compositions containing no polyol is about 30% to about 70% while for those compositions containing a polyol it is about 15% to about 50%. The aforementioned percentages of reactive diluent are on a weight solids basis, it being understood the diluent is considered a solid since it reacts into the coating.

A crosslinking agent is included in the compositions at a level of from about 20% to about 70%, preferably about 35% to about 55% when a polyol is present and about 30% to about 70% when a polyol is not present on a weight solids basis. Suitable crosslinking agents are aminoplast resins, phenoplast resins, blocked or unblocked isocyanate resins and mixtures thereof. The aminoplast resins are preferred.

Aminoplast resins are based on the addition products of formaldehyde, with an amino- or amido-group carrying substance, e.g., urea, ethylene diurea, ethylene urea, melamine and benzoguanamine. Condensation products obtained from the reaction of alcohols and formaldehyde with melamine, urea or benzoguanamine are preferred herein. Useful alcohols used to make etherified products are monohydric alcohols such as methanol, ethanol, propanol, butanol, benzyl alcohol and butoxyethanol. An etherified melamine-formaldehyde resin is the preferred aminoplast resin.

Several different isocyanate crosslinking agents can be used. Examples include the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane and 1,2-cyclohexane diisocyanates; the aromatic compounds, such as m-phenylene, p-phenylene, 4,4'-diphenyl, 1,5-naphthalene and 1,4-naphthalene diisocyanates; the aliphatic aromatic compounds such as 4,4'-diphenylene methane, 2,4-or 2,6-tolylene, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate; the triisocyanates such as triphenyl methane,-4,4'4"-triisocyanate, 1,3,5-triisocyanate benzene and 2,4,6-triisocyanate toluene; and the tetraisocyanates such as 4,4'-diphenyldimethyl methane-2,2', 5,5'-tetraisocyanate; and the polymerized polyisocyanates such as tolylene diisocyanate dimers and trimers.

Blocked isocyanates useful as a crosslinking agent are derived from the organic isocyanates described above. Preferred isocyanates used to form useful blocked isocyanates include p-phenylene diisocyanate; biphenyl diisocyanate; toluene diisocyanate; 3,3'-dimethyl-4,4'-biphenylene diisocyanate; 1,4-tetramethylene diisocyanate; hexamethylene diisocyanate; 2,2,4-trimethylhexane-1,6-diisocyanate; methylene bis-(phenyl-isocyanate); isophorone diisocyanate; 1,2,4-benzene triisocyanate; polymethylene polyphenyl isocyanate; bis-(isocyanatocyclohexyl) methane; and methyl cyclohexyl diisocyanate, as well as derivatives thereof. Typical blocking agents are phenols, thiols, oximes, caprolactams, and secondary aromatic amines. Many of these compounds are commercially available. "The Chemistry of Organic Film Formers", Robert E. Krieger Pub. Co., copyrighted 1977, by D. H. Solomon, pp. 216–217, contains a description of many blocked isocyanates that can be used here. The disclosure of this publication is herein incorporated by reference.

Phenoplast resins include the condensation product of an aldehyde with a phenol. Formaldehyde is a preferred aldehyde. Various phenols can be used, e.g., phenol per se, cresol, para-phenylphenol, para-tertiaryphenol, para-tertiaryamylphenol and cyclopentylphenol. The methylol phenol ethers described in U.S. Pat. No. 2,597,330 (herein incorporated by reference) are especially useful.

A curable polyol resin can be present in the compositions of this invention to provide coatings with a desired set of characteristics, but are not required. Thus the polyol represents from about 0% to about 60%, preferably from about 15% to about 50%, on a weight solids basis, of the compositions. Several different classes of polyol-containing resins are known and can be used. Classes of materials which can be used herein are hydrocarbon polyols, ester polyols, ether polyols, polyester polyols, polyether polyols, polamide polyols, polyurethane polyols, polyurea polyols, cyclic nitrogen-containing polyols, acrylic polyols and mixtures thereof. The hydrocarbon polyols, polyether polyols and polyester polyols are preferred with the polyester polyols being most preferred. Common characteristics of the organic polyol resins are they have a hydroxyl equivalent weight of from about 30 to about 2000, preferably from about 40 to about 1000, and a hydroxyl functionality of at least about 2.0. Hydroxyl functionality is defined to be $$\frac{\text{number average molecular weight}}{(\text{OH} + \text{H}+) \text{ equivalent weights of polyol}}.$$

Classes of the polyols are described in the following paragraphs.

Hydrocarbon polyols include trimethylolpropane; trimethylolethane; glycerol; 1,2,4-butane triol; 1,2, 6-hexane triol; erythritol; sorbitol; mannitol; and diglycerol. The triols are preferred.

Ester polyols are obtained by reacting a polyol with one mole or less of a monocarboxylic acid. The polyols have a hydroxyl functionality of at least 3.0, examples of which are described immediately above. Suitable monocarboxylic acids include benzoic acid, hexanoic acid, octanoic acid, decanoic acid. Lauric acid, myristic acid, stearic acid, oleic acid, linoleic acid and linolenic acid can be used, but are less desirable.

Useful ether polyols are made by reacting a suitable polyol as described above with a non-ester-containing monoepoxide, e.g., butyl glycidyl ether, octyl glycidyl ether, allyl glycidyl ether, phenyl glycidyl ether, 1,2-butylene oxide, and styrene oxide.

Polyester polyols are generally formed by the esterification of polyols with polycarboxylic acids or acid anhydrides. The lower molecular weight, i.e. below above 1000, preferably below about 600, polyester polyols are preferred for high solids compositions. The polyols conventionally employed in making the polyester polyols include alkylene glycols, such as ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly (oxytetramethylene) glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the above-described polyols include phthalic, isophthalic, terephthalic, tetrahydrophthalic, hexahydrophthalic, adipic, azelaic, sebacic, maleic, glutaric, chlorendic, tetrachlorophthalic, maleic, fumaric, itaconic, malonic, suberic, 2-methylsuccinic, 3,3-diethylglutaric, 2,2-dimethylsuccininc acid and trimellitic acid. Anhydrides of these acids where they exist can also be employed and are encompassed by the term "carboxylic acid." Monocarboxylic acids such as benzoic acid and hexanoic acid can also be used, provided the average functionality of the polyol is above about 2.0. Saturated acids (including those aromatic acids where the only unsaturation is in the aromatic ring) are preferred.

It is also possible to produce polyester polyols containing one of two alkylene oxide groups per hydroxy group and preferably no more than three alkylene oxide groups per ester group. Such resins preferably have a molecular weight of 1,000 or less. The alkylene oxide-containing polyester polyol can be produced by substituting an alkylene oxide containing polyol for all or part of the polyol component used to produce the polyester polyol. Useful alkylene oxide containing polyols include diethylene glycol, triethylene glycol, dipropylene glycol, tetraethylene glycol, 2,2-bis(hydroxyethoxyphenyl) propane and 2,2-bis(beta-hydroxypropoxyphenyl) propane. These polyester polyols can also be produced by oxalkylating any one of the above-described polyester polyols.

Polyester polyols can also be made from the reaction of a lactone with a polyol. Preferred lactones are the epsilon-caprolactones. Polyols, such as the above described diols and triols are used in the reaction with the lactone.

Examples of polyether polyols are polyalkylene ether polyols which include those having the following structural formula:

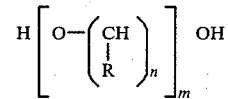

where the substituent R is hydrogen or lower alkyl containing from 1 to 5 carbon atoms including mixed substituents, n is from 2 to 6 and m is from 2 to 20. Included are poly (oxytetramethylene) glycols, poly (oxyethylene) glycols, poly (oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, and bisphenol A, or other higher polyols, such as trimethylolpropane and pentaerythritol. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

Polyamide polyol resins useful in the instant invention are produced using conventional techniques. In general, the resins are produced from any of the above-described polyacids or lactones and diols, triols and higher alcohols and small amounts of diamines or amino alcohols. Suitable diamines and amino alcohols include hexamethylenediamine, ethylenediamine, monoethanolamine, phenylenediamine, toluenediamine and diethanolamine. For low-organic solvent-containing compositions, the molecular weight of the polyamide polyols is generally less than about 800.

Besides the above-mentioned polymeric polyols, polyurethane polyols can also be used. These polyols can be prepared by reacting any of the abovementioned polyols with a minor amount of polyisocyanate (OH/NCO equivalent ratio greater than 1:1, preferably greater than about 2:1) so that free hydoxyl groups are present in the product. Mixtures of both high molecular weight and low molecular weight polyols can be used. Among the low molecular weight polyols are diols or triols such as aliphatic polyols including alkylene polyols containing from 2 to 18 carbon atoms. Examples include ethylene glycol, 1,4-butanediol, 1,6-hexanediol and cycloaliphatic polyols such as 1,2-hexanediol and cyclohexanedimethanol. Examples of triols include trimethylolpropane and trimethylolethane. Useful high molecular weight polyols are those described above. Also useful are polyols containing ether linkages such as diethylene glycol and triethylene glycol. Also, acid-containing polyols such as dimethylolpropionic acid and amino alkyl alcohols such as ethanolamine and diethanolamine can be used.

The organic isocyanate which is used to prepare the polyurethane polyols can be an aliphatic or an aromatic isocyanate or a mixture of the two. The aliphatic isocyanates are preferred when exterior durability is a requisite. Also, diisocyanates are preferred although higher polyisocyanates and monoisocyanates can be used in place of or in combination with diisocyanates. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and tolyl isocyanate. Examples of suitable aromatic diisocyanates are 4,'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include, 1,4-cyclohexyl diisocyanate, isophorone diisocyanate, alpha, alpha'-xylene diisocyanate and 4-4'-methylene-bis(cyclohexyl isocyanate).

The polyurea resins are generally produced by reacting any of the above-described polyisocyanates with either an amino alcohol, such as monoethanol amine, or an amino alcohol and a diol. Preferably for high solids compositions, the molecular weights of the polyurea polyols are less than about 800 where no alkylene oxide groups are present and preferably lower than 1,000 where one or two alkylene oxide groups per hydroxy group is present.

Suitable cyclic nitrogen containing polyols include such compounds as tris(hydroxyethyl) isocyanurate (THEIC), N,N'-bis(hydroxyethyl) dimethyl hydantoin (BHDH), 1,4-bis [4,4-bis(hydroxymethyl)-1,3-oxazol-2-ene-2-y] butane, hydroxyalkylated THEIC, hydroxyalkylated BHDH, bis(hydroxyethyl) ethylene urea, and 4,4-bis(hydroxymethyl)-1,3-oxazolidin-2-one.

There are also polyol-containing acrylics which are useful as the film-forming component.

In one embodiment of this aspect of the invention, thermosetting acrylic resins comprising the hydroxyalkyl esters of ethylenically-unsaturated carboxylic acids and at least one other ethylenically unsaturated monomer copolymerizable therewith, such as are described in U.S. Pat. Nos. 2,681,897 and 3,084,184 are used. Preferred interpolymers of the class described are those containing hydroxyalkyl esters in which the alkyl group has up to about 18 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there can be employed the mono- or diesters of unsaturated dicarboxylic acids, such as maleic acid, fumaric acid and itaconic acid, in which at least one of the esterifying groups is hydroxyalkyl. Such esters include bis-(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids, can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monolefinic and, in minor amounts, polyolefinic hydrocarbons, halogenated monoolefinic and diolefinic hydrocarbons, unsaturated esters of organic and inorganic acids, esters or amides of unsaturated acids, nitriles, unsaturated acids, and the like. Examples of such monomers include styrene; butadiene-1,3;2-chlorobutene; acrylonitrile; alpha methyl styrene; alpha chlorostyrene; 2-chlorobutadiene-1;3, 1,1-dichloroethylene; vinyl butyrate; vinyl acetate; vinyl chloride; allyl chloride; dimethyl maleate; divinyl benzene; diallyl itaconate and triallyl cyanurate. The preferred monomers are acrylates and methacrylates, such as ethyl acrylate, propyl acrylate, ethylhexyl acrylate, acrylamide, methyl methacrylate, and butyl methacrylate, as well as methacrylic and acrylic acid.

Another important class of thermosetting acrylic resins that are used comprises the crosslinking carboxyl-containing polymers. The thermosetting carboxyl polymers that are used herein consist generally of acrylic resins or modified acrylic resins containing from about 3 to about 40 percent by weight of ethylenically unsaturated acid.

Acrylic materials which may be used include acrylates, such as ethyl acrylate, butyl acrylate, and hexyl acrylate; methacrylates, such as methyl methacrylate, isopropyl methacrylate, and hexyl methacrylate; acrylonitriles; maleate esters, such as dibutyl maleate; and fumarates, such as ethyl fumarate.

The ethylenically unsaturated acids which may be used are those such as acrylic acid, methacrylic acid, fumaric acid, maleic acid and itaconic acid.

The second type of polyol-containing acrylics comprises interpolymers of an unsaturated carboxylic acid amide with at least one other monomer having a

group, said interpolymers being characterized by having amido hydrogen atoms replaced by the structure—$RCHOR_1$, wherein R is selected from the group consisting of hydrogen and saturated lower aliphatic hydrocarbon radicals and $R_1$ is a member of the class consisting of hydrogen and lower alkyl radicals. In general, these interpolymers can be produced in two ways. In the first method, the unsaturated carboxylic acid amide chosen is an N-alkoxymethyl acrylamide (i.e., a material having an -NHRCHOR group in the molecule). This N-alkoxymethyl acrylamide is then polymerized with at least one other monomer having a

group to produce a useful interpolymer. In the second method, an unsaturated carboxylic acid amide e.g., acrylamide is polymerized with at least one other monomer having a

group and is then reacted with an aldehyde to form a useful interpolymer.

Examples of the interpolymers usable and their methods of manufacture are disclosed in U.S. Pat. Nos. 2,870,117, 2,978,434, 3,035,965 and 3,079,434. These interpolymers contain hydroxyl groups.

Among the monomers which may be polymerized with the unsaturated carboxylic acid amides are acrylates such as methyl acrylate, ethyl acrylate, isobutyl acrylate, and hexyl acrylate; styrene, vinyl toluene, maleate esters, such as dibutyl maleate; acidic materials such as acrylic acid, methacrylic acid, and maleic anhydride; vinyl ethers; vinyl ketones; vinyl pyridines, allyl acetoacetates; glycidyl acrylates; methacrylamide; dimethylbenzyl methacrylate; hydroxy-substituted acrylics, such as hydroxyethyl acrylate; and the adducts of epsilon-caprolactone and hydroxyalkyl acrylates. In general, a preferred group of monomers includes ethyl acrylate, butyl acrylate, methyl acrylate, styrene, vinyl toluene, acrylonitrile, acrylic acid, monomethyl styrene and hydroxyethyl acrylate.

It has been found that preferred unsaturated carboxylic acid amide interpolymers are obtained when at least two monomeric compounds are interpolymerized with the N-alkoxymethylacrylamide-containing or the amide-containing material. In this manner, it is possible to tailor the interpolymer to have any desired degree of hardness or flexibility. For example, one useful ternary interpolymer is prepared from the acrylamide, hydroxyethyl acrylate and methyl methacrylate, this interpolymer then being reacted with an aldehyde to produce a material useful in this invention.

It is known that small amounts of methyl methacrylate tend to improve the hardness of multi-component interpolymers where one of the monomers is of the type which forms soft homopolymers. It has also been found that a small quantity of an acid monomer, such as acrylic acid, methacrylic acid, crotonic acid, maleic acid, or fumaric acid, is particularly useful as an internal catalyst in that it imparts to the coating composition desirable fast curing properties. In place of acrylamide, any other polymerizable amide, for example, methacrylamide or itaconic diamide, may be utilized.

The N-alkoxymethyl acrylamides useful in this invention are known in the art, and include such materials as N-alkoxymethyl acrylamides, N-alkoxymethyl methacrylamides, alkoxymethyldiacetone acrylamides, O-(acryloxyethyl)-N-(alkoxymethyl) carbamates, and N-methyl-N-alkoxymethylacrylamides. Specific examples include N-butoxymethylacrylamide, N-isobutoxymethylacrylamide, N-(methoxyethoxymethyl) acrylamide, methoxymethyldiacetoneacrylamide, O-(methacryloxyethyl)N-methoxymethyl carbamate and hydroxylmethylacrylamide.

The above described curable resins are, in general, solvent soluble. For the resins to be water-soluble or -dispersible, it is necessary to introduce salt groups into the resins. This method of making resins watersoluble or dispersible is well known in the art.

The vehicle portion of the coating compositions consisting essentially of the reactive diluent, crosslinking agent and polyol resin represents from about 5% to about 100% of the composition. Conventional additives, such as surfactants, pigments, dyes, antioxidants, etc., are included in the compositions for their known functions. Organic solvents and conventional additives can be included in the coating compositions. A further characterizing feature of preferred compositions is that they are sprayable when containing less than about 50 percent volatile organic solvent, water or a mixture thereof. Thus, it is preferred that the compositions contain less than about 50 percent, more preferably less than 20 percent, of a volatile organic solvent and/or water.

Compositions of this invention have a prolonged shelf stability when properly formulated. However, when a crosslinking agent is used which is reactive at room temperature with the remaining components of the composition, the compositions should be used shortly after mixing. Alternatively, these compositions can be packaged as two package compositions. One part of the package consists essentially of the organic polyol, if any, and the reactive diluent and the second part of the package consists essentially of the crosslinking agent.

The coating compositions are applied by any convenient method, including spraying, dipping and flow coating. The compositions have been found especially useful for the coating of substrates such as wood, metal, wallboard and various ceramics.

Examples which illustrate the invention follow.

EXAMPLE I

A reaction vessel is set up with heating means, stirring means and a nitrogen sparge. The vessel is initially charged with 2103 parts of a glycidyl ester of Versatic 911 acid (available from Shell Chem. Co. as Cardura E), 897 parts neopentyl glycol and 6 parts butyl stannoic acid. The mole ratio of glycidyl ester to neopentyl glycol is 1:1. The mixture is heated to 130° C. and then allowed to exotherm to 170°–175° C. After a constant viscosity is achieved (about 5 hours), the mixture is sampled and determined to have no epoxy groups, an acid number of 2.2, a non-volatile content of 91%, a Gardner-Holdt viscosity of X+ and a hydroxyl value of 233.

EXAMPLE II

A reaction vessel set up as in Example I is charged with 1937 parts Cardura E, 1063 parts dimethylolpropionic acid and 9 parts dimethylcoco-amine. The mole ratio of glycidyl ester to dimethylolpropionic acid is 1:1. The mixture is heated to 120° C. and allowed to then exotherm to 140°-153° C. The mixture is maintained at this temperature for about 11 hours, and then held at about 180° C. for 2 hours. The mixture has no epoxy groups, an acid number of 6.1, a non-voltile content of 99%, a Gardner-Holdt viscosity of Z-6+ and a hyroxyl value of 428.

EXAMPLE III

To a reaction vessel set up as in Example I is charged 1952 parts Cardura E, 616 parts hexahydrophthalic anhydride, 72 parts deionized water, 4 parts triethanolamine and 2 parts butylstannoic acid. Molar ratio of glycidyl ester to hexahydrophthalic acid=2:1. The mixture is heated to 88° C. and then allowed to exotherm to about 93° C. This temperature is maintained for about 2 hours and then increased to about 110° C. After 8 hours, the reaction mixture has no epoxy groups, a hydroxyl value of 171, a non-volatile content of 98.6% and a Gardner-Holdt viscosity of Z-6+.

EXAMPLE IV

A reaction vessel is charged with 1332 parts Cardura E, 1668 parts 12-hydroxystearic acid and 6 parts dimethylcoco-amine. The mole ratio of glycidyl ester to 12-hydroxystearic acid is 1:1. The vessel is equipped the same as the vessel in Example I. The contents of the vessel is heated to 115° C. and then allowed to exotherm to 138° C. When the acid number of the mixture is less than 3 (about 5 hours) the heating means is removed. The final product has an acid number of 1.8, no epoxy groups, a non-volatile content of 97.4%, a Gardner-Holdt viscosity of V and a hydroxyl value of 197.

EXAMPLE V

A reactive diluent based on the reaction of a glycidyl ester and adipic acid is made by charging to a vessel as described in Example I 2322 parts Cardura E, 678 parts adipic acid and 9 parts dimethylcoco-amine. The mole ratio of glycidyl ester to carboxylic acid is 2:1. The reactants are heated to 105° C. and then allowed to exotherm. A temperature of 105°-150° C. is maintained for about 5 hours until analysis shows no epoxy groups. The final product has an acid number of 5.8, a non-volatile content of 95.4%, a Gardner-Holdt viscosity of Z+, and a hydroxyl value of 190.

EXAMPLE VI

One thousand and eighty-nine (1089) parts Cardura E, 911 parts 2,2-dimethyl-3-hydroxypropyl-2,2-dimethyl-3-hydroxypropionate (available from Union Carbide Corp. as Ester Diol 204) and 4 parts butyl stannoic acid is added to a reaction vessel as described in Example I. Mole ratio of glycidyl ester to diol=1:1. The reactants are heated and then maintained at a temperature of 126°-177° C. After 8 hours the reaction mixture has no epoxy groups, an acid number of 0.4, non-volatile content of 90.4%, Gardner-Holdt viscosity of Y+, and a hydroxyl value of 275.

EXAMPLE VII

A coating composition is formulated as follows:

|  | % |
|---|---|
| Aminoplast resin (1) | 22.8 |
| Reactive diluent of Example VI | 14.3 |
| Pigment paste (2) | 4.9 |
| Acrylic resin solution (3) | 19.5 |
| P-Toluene sulfonic acid (40% by weight solution in isopropanol) | 0.3 |
| Phenyl acid phosphate (75% by weight solution in isopropanol) | 0.2 |
| Benzoltriazole (4) | 1.1 |
| Microgel dispersion (5) | 12.8 |
| Butyl acetate | 18.1 |
| Ethyl alcohol | 6.0 |

(1) Available from American Cyanamid Co. as Cymel 303.
(2) Contains 46.2% aluminum pigment paste; 45.7% acrylic resin solution derived from hydroxyethyl acrylate, methacrylic acid, styrene, butylacrylate and isobutylmethacrylate, 10:4:20:15:51 (65% solution in solvent); and 8.1% solvent.
(3) Same as used in pigment paste
(4) Available from Ciba-Geigy Chem. Corp. as Tinuvin 328.
(5) Corresponding to Example II of U. S. Pat. No. 4,147,688.

The composition has a 60% solids content by weight and a #4 Ford cup viscosity of 17.9 seconds at 24° C.

The composition is spray applied to a metal panel substrate and then baked at 130° C. for 17 minutes to give a 2 mil dry film thickness. The resultant coating is durable and has a good appearance. The good durability is based on the coating's acid resistance, solvent resistance, water resistance and accelerated weathering resistance.

EXAMPLE VIII

A coating composition having substantially no polyol is made by removing the acrylic resin solution from the Example VII composition and replacing it with an additional 19.5% reactive diluent. Panels coated with the composition have good durability as measured by the coating's good acid, solvent, weathering and water resistance.

What is claimed is:
1. A coating composition capable of liquid application to a substrate, the vehicle portion of the composition, on a weight solids basis, consisting essentially of:
   (a) from about 35% to about 55% of a crosslinking agent;
   (b) from about 15% to about 50% of a curable polyol resin; and
   (c) from about 15% to about 50% of a reactive diluent derived from the reaction of (i) from about 0.25 to about 4 moles of a glycidyl ester with (ii) each mole of a functional material having a molecular weight of less than about 1000, a hydroxy equivalent weight of from about 30 to about 1000 and a carboxy equivalent weight of from about 50 to about 1000, provided the total hydroxyl and carboxyl functionality of the functional material is at least 2.0, said reactive diluent characterized in having an acid number of less than about 50, a non-volatile content of greater than about 85% and a Gardner-Holdt viscosity of less than Z-10.
2. The composition of claim 1 wherein the functional material has a molecular weight of from about 60 to about 500.

3. The composition of claim 2 wherein the functional material has a molecular weight of from about 100 to about 300.

4. The composition of claim 2 wherein the functional material has from 0 to 10 hydroxyl groups, from about 0 to 10 carboxyl groups and a total hydroxyl and carboxyl functionality of at least 2.0.

5. The composition of claim 3 wherein the functional material has from 0 to 3 hydroxyl groups, from 0 to 3 carboxyl groups and a total hydroxyl and carboxyl functionality of at least 2.0.

6. The composition of claim 4 wherein the functional material used in making the reactive diluent is a polyhydric compound having 2 to 4 hydroxyl groups, a dicarboxylic acid or anhydride thereof or a compound having at least one hydroxyl group and at least one carboxyl group.

7. The composition of claims 1 or 6 wherein the glycidyl ester has the formula:

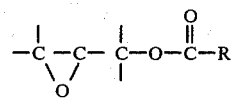

where R is a hydrocarbon group having from 1 to 17 carbon atoms.

8. The composition of claim 7 wherein the functional material reacted with the glycidyl ester is selected from the group consisting of neopentyl glycol; dimethylolpropionic acid; 2,2-dimethyl-3-hydroxypropyl-2,2-dimethyl-3-hydroxypropionate; 12-hydroxystearic acid; adipic acid; hexahydrophthalic acid; and mixtures thereof.

9. The composition of claim 7 wherein the reactive diluent has a non-volatile content of greater than about 90% and a Gardner-Holdt viscosity of less than Z-8.

10. The composition of claim 8 wherein the hydrocarbon group in the glycidyl ester has from 4 to 12 carbon atoms.

11. The composition of claim 1 wherein the polyol is selected from the group consisting of a hydrocarbon polyol, ester polyol, ether polyol polyester polyol, polyether polyol, polyamide polyol, polyurethane polyol, polyurea polyol, cyclic nitrogen-containing polyol, acrylic polyol and mixtures thereof.

12. The composition of claim 11 wherein the polyol has a hydroxyl equivalent weight of from about 30 to about 2000 and a hydroxyl functionality of at least 2.0.

13. The composition of claim 11 wherein the crosslinking agent is selected from the group consisting of an aminoplast resin, phenoplast resin, isocyanate blocked isocyanate and mixtures thereof.

14. The composition of claim 11 wherein the crosslinking agent is an aminoplast resin.

15. The composition of claim 7 wherein about 1 to about 3 moles of the glycidyl ester is reacted with each mole of the functional compound.

* * * * *